(12) United States Patent
Martin et al.

(10) Patent No.: US 6,701,203 B2
(45) Date of Patent: Mar. 2, 2004

(54) DETERMINING THE CAPACITY COMPONENTS OF MULTI CHAMBER SYSTEMS

(75) Inventors: Donald P. Martin, Essex Junction, VT (US); Michael S. McClintock, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 09/949,238

(22) Filed: Sep. 7, 2001

(65) Prior Publication Data

US 2002/0052667 A1 May 2, 2002

Related U.S. Application Data

(60) Provisional application No. 60/231,268, filed on Sep. 8, 2000.

(51) Int. Cl.⁷ .................................................. G06F 19/00
(52) U.S. Cl. ........................ 700/111; 702/182; 700/109; 700/104
(58) Field of Search ................................ 700/111, 109, 700/104; 702/182

(56) References Cited

U.S. PATENT DOCUMENTS

| | | | | | |
|---|---|---|---|---|---|
| 5,089,970 | A | * | 2/1992 | Lee et al. | 700/96 |
| 5,375,061 | A | * | 12/1994 | Hara et al. | 700/101 |
| 5,402,350 | A | * | 3/1995 | Kline | 700/101 |
| 5,914,879 | A | * | 6/1999 | Wang et al. | 700/111 |
| 6,074,443 | A | * | 6/2000 | Venkatesh et al. | 29/25.01 |
| 6,418,351 | B1 | * | 7/2002 | Martin | 700/108 |

* cited by examiner

*Primary Examiner*—Leo Picard
*Assistant Examiner*—Michael D. Masinick
(74) *Attorney, Agent, or Firm*—Richard M. Kotulak

(57) ABSTRACT

This invention entails a data analysis system and method that was developed to specifically address the unique issues in understanding the capacity components of multi chamber systems. The analysis system expresses all components of capacity loss for all chambers in each tool in terms of a full tool equivalent (FTE). The analysis system measures how long the tool is available with only 1 chamber, 2 chambers, etc. working. It then combines that data with the WIP states to accurately determine the production, idle-no-WIP, idle-no-operator, and down components of a full tool.

2 Claims, 5 Drawing Sheets

DETERMINING THE CAPACITY COMPONENTS OF MULTI CHAMBER SYSTEMS

This invention claims priority based on the provisional Patent Application Serial No. 60/231,268, filed on Sep. 8, 2000.

BACKGROUND OF THE INVENTION

In order to effectively manage productivity improvements for equipment in a semiconductor manufacturing line or for that matter any manufacturing line, it is necessary to understand and measure all the components of capacity loss for each tool type. The actual performance of each of these tool sets needs to be compared against the plan performance so that resources can be directed towards improving those tool sets and components that are furthest from plan. While many tool sets are relatively straight forward in this regard, there are a class of tool sets, called multi chamber tools, where this analysis is complex. Existing methods of measuring components of capacity on multi chamber systems often are lacking when tied to production systems.

SUMMARY OF THE INVENTION

One reason existing methods tie together chamber availability states with WIP states. For example, understanding the parts per hour component without understanding the interaction of the chamber states can lead to inaccurate plans and/or incomplete characterization of actual performance shortfalls. This invention is a data analysis system method which addresses the unique issues in understanding the capacity components of multi chamber systems. The analysis system expresses all components of capacity loss for all chambers in each tool in terms of a full tool equivalent (FTE). The analysis system measures how long the tool is available with only 1 chamber, 2 chambers, etc. working. It then combines that data with the WIP states to accurately determine the production, idle-no-WIP, idle-no-operator, and down components of a full tool. By using the FTE method, the parts per hour component for the entire system, as well as the other capacity components, can be calculated. The result is that use of the methodology of this invention enables one to better understand capacity loss components for a set of multi chamber tools. By more accurately measuring these capacity components, better solutions can be implemented resulting in improved system performance and thus equipment productivity.

DETAILED DESCRIPTION OF THE INVENTION

Continuous improvement in the productivity of equipment in a manufacturing line is essential in order to manage competitiveness and profitability. Measuring and understanding tool performance and the components of capacity loss is a key ingredient for this improvement process. For many tool types the capacity components associated with an average daily throughput as shown in the following equation can be readily determined;

$$\text{Throughput} = \text{Tool Availability} * \text{Operator Availability} * \text{Utilization} * \text{Parts Per Hour} * 24 \qquad (1)$$

Tool availability is equal to one minus the fraction of time a tool is down. Operator availability is equal to one minus the fraction of time a tool is up, and there is WIP to be run, but the WIP has not been loaded or unloaded from the tool. Utilization is equal to one minus the fraction of time that a tool is up but there is no WIP to be run on the tool. Finally, parts per hour is the total units run divided by the true production time. Examples of tools where these throughput components are easy to measure in a semiconductor manufacturing environment are lithography, ion implant, furnaces, etc.

However, there are a set of tools, called multi chamber tools, where the delineation of the throughput components is more difficult. For example, an etch tool may be composed of two etch chambers and a handler. In order to understand the performance of the entire tool, the state of all the tool components must be understood. Thus, even though both etch chambers may be up and ready, if the handler is down, then no product can be processed. When the tool is processing product, there will be a different parts per hour if one chamber is up or if both chambers are up.

This application describes a methodology for combining chamber, handler, and production data to arrive at a system level set of measurements called Full Tool Equivalent (FTE). For chambers that have equal process speed, the FTE expresses in fractions of a whole tool (i.e. the handler is up and all chambers are running) the distribution of tool capacity across the throughput components of tool availability, operator availability, idle-no-operator, idle-no-WIP, and tool speed.

Figure 1:
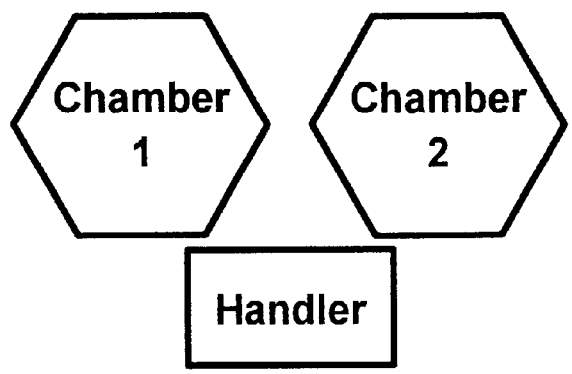
FIG. 1 illustrates a two chamber tool, a simple example of a multi-chamber tool.

In order to more clearly describe the methodology, the two chamber system shown in FIG. 1 will be analyzed. Chamber 1 and chamber 2 can process product at the same rate and all product is put into and taken off from the tool through the handler.

Figure 2:
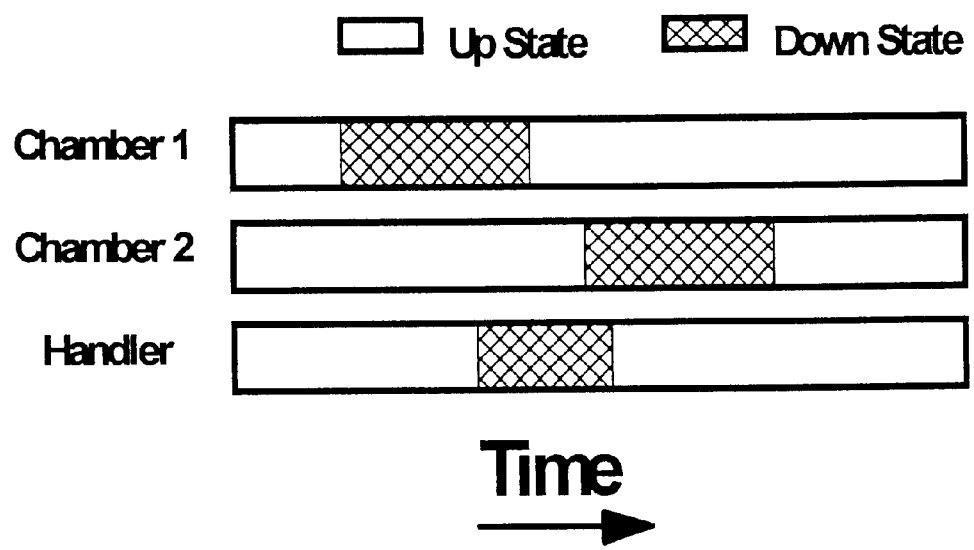
FIG. 2 illustrates in graphical form an example of chamber state information contained in a tool data base.

Contained in a tool state data base are all the time intervals when each element of the multi chamber tool is in an up state or a down state as shown in FIG. 2. The first step in the process is to change the chamber states to reflect the effect of the handler being down. Whenever the handler is down, nothing can get processed through either chamber.

Figure 3:
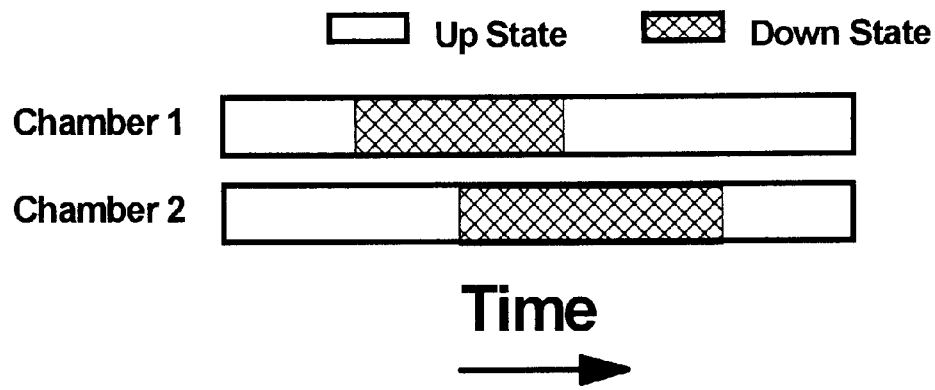
FIG. 3 illustrates in graphical form chamber state adjustment for a handler in a tool data base.

The next step is to query this adjusted data base to determine the total amount of time that both chambers are up and the total amount of time that only one chamber is up. The FTE availability is then calculated by weighting the time in each state by the fraction of the chambers in that state and dividing by the total time. In the example shown in FIG. 3, if the total time under consideration is 24 hours, then both chambers are up 10 hours and one of the two chambers is up for an additional 10 hours. Both chambers are down for four hours.

$$\text{FTE Tool Availability} = [(10*1.0)+(10*0.5)]/24 = 0.625 \qquad (2)$$

Equation 2 is interpreted to mean that 0.375 of a whole tool is unavailable to production due to the combination of down times across both chambers and the handler.

In general, for N chambers in a tool and if Time (N) represents the time that N chambers are up, then $$FTE \text{ Tool Availability} = \frac{\text{Time}(N) + [(N-1)/N]*\text{Time}(N-1)\ldots}{\text{Total Time}} \quad (3)$$

Figure 4:
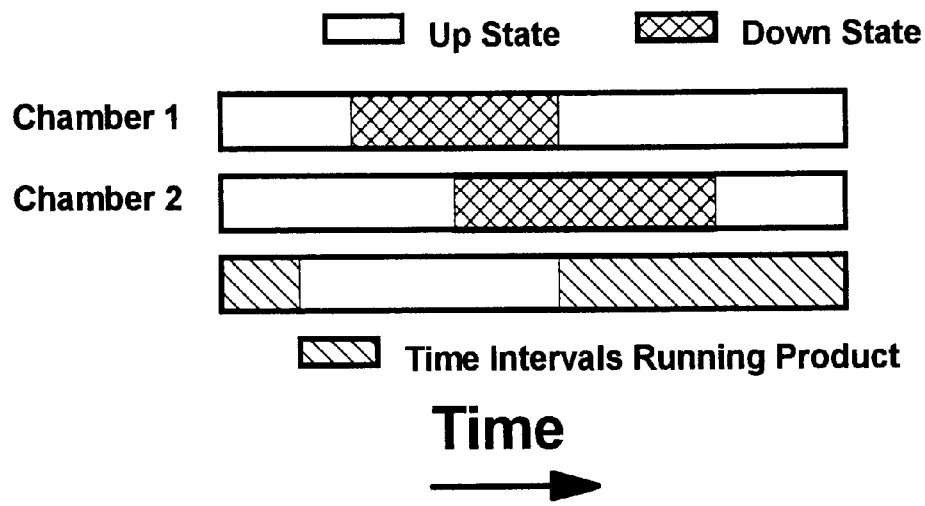
FIG. 4 illustrates in graphical form an example of tool production data.

Another aspect of this invention is determining the FTE for actual production. In addition to the tool state data base, there is a production data base that contains all the time intervals that the tool was actually running production. These time intervals are shown in FIG. 4.

In this case, eight hours of production was done when both chambers were up and six hours of production were done when only one chamber was up. Substituting these values into Equation 3 yields a FTE Production of 0.45

Figure 5:
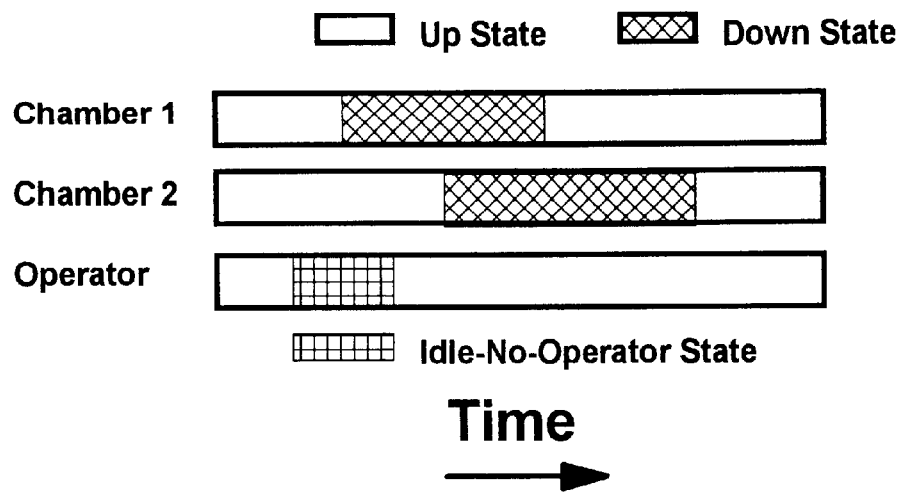
FIG. 5 illustrates in graphical form an example of tool and operator time intervals.
Figure 6:
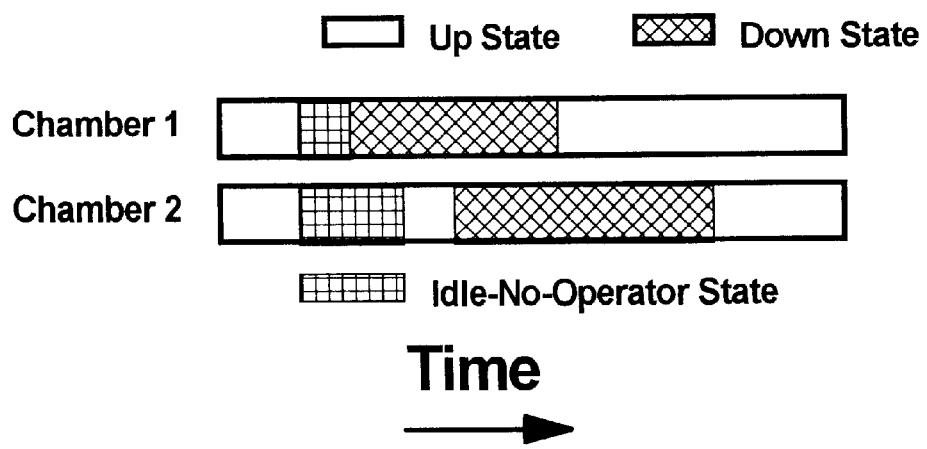
FIG. 6 illustrates in graphical form an example of chamber states with idle-no-operator intervals factored into the states.

Another aspect of this invention is determining the FTE for operator availability. There are time intervals when a tool is available, but is not actually used for production. One example of this situation is when a tool is up but there is no operator to load or unload the product. This is called idle-no-operator dine and affects all chambers because the load and unload is done through the handler. One of the results of combining the tool state and lot state data bases is that the idle-no-operator time intervals can be determined. An example of these intervals is shown in FIG. 5. Since the idle-no-operator causes both chambers to be unusable, the effective down states for the chambers can be altered as shown in FIG. 6.

The result of treating the idle-no-operator as a down state leads to 8 hours where both chambers are up and 8 hours where only one chamber is up. Using Equation 3 yields a new FTE of 0.5. Since the FTE without the idle-no-operator state was 0.625 as shown in Equation 2, then the operator impact on tool performance is 0.125 of a tool.

$$FTE \text{ Idle-No-WIP} \quad (4)$$

The *FTE idle-no-WIP* is related to the other *FTE* components by Equation 4.

Tool Unavailable + Production + No Operator + Idle = 1

Therefore FTE idle-no-WIP=0.05
A summary of these results is shown in Table 1 below:

TABLE 1

FTE capacity components

| Capacity Component | FTE |
|---|---|
| Production | 0.450 |
| Idle No Operator | 0.125 |
| Idle No WIP | 0.050 |
| Unavailable | 0.375 |

Once the production FTE has been calculated, the parts per hour FTE can be calculated as shown Equation 5 below:

FTE PPH=Wafers Processed/(FTE Production*24)   (5)

This actual FTE parts per hour can then be compared to the planned FTE parts per hour.

Figure 7:
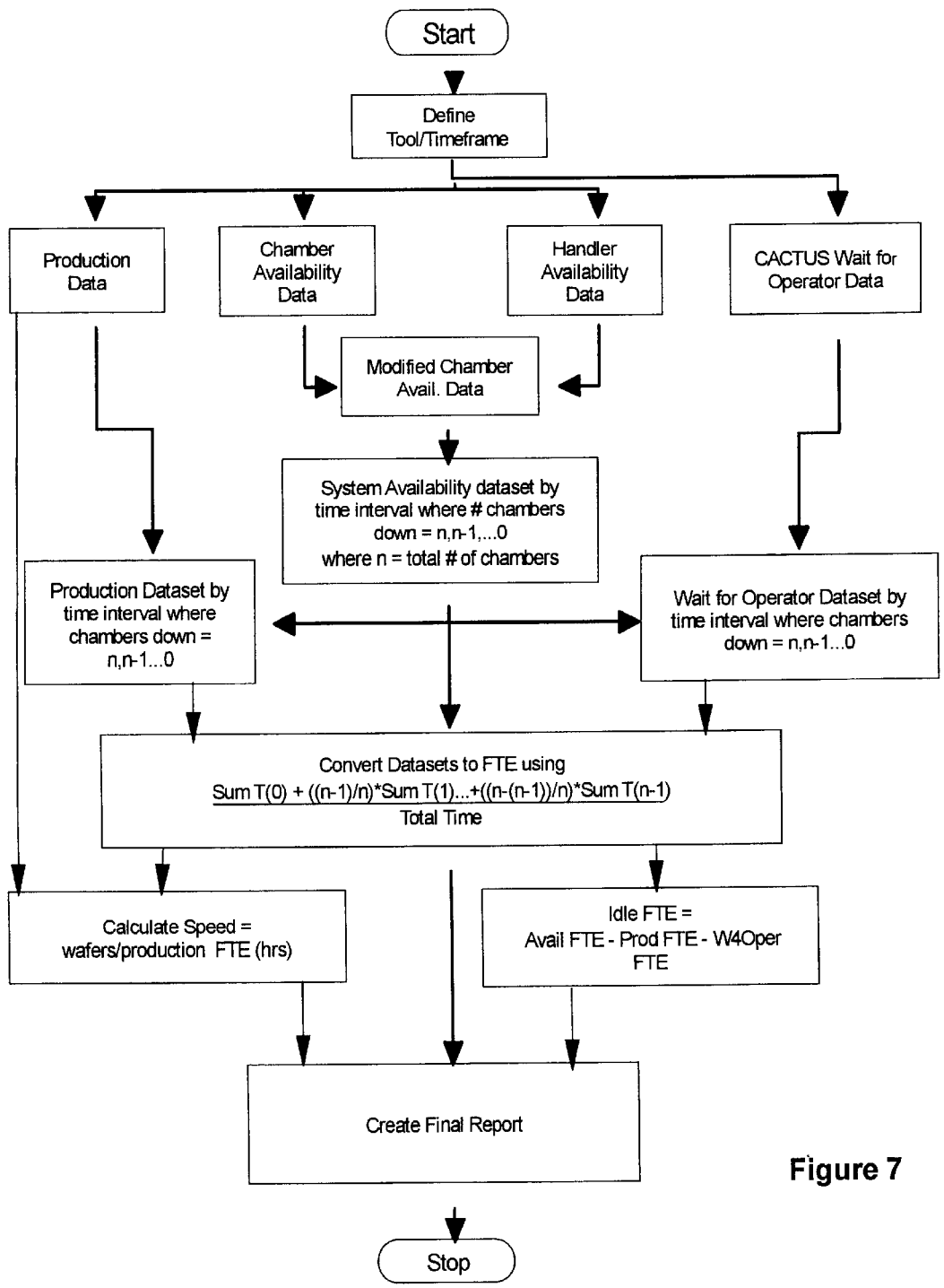
FIG. 7 shows the flow diagram for a multi-chamber performance measurement system.

A flow diagram of the FTE analysis system is shown in FIG. 7.

An Example of Using FTE

Table 2 shows the difference the use of the FTE calculation can make on determining the size of the different capacity components. These data were obtained for a 2 chamber AME 5200 tool.

TABLE 2

AME etch tool results

| Capacity Component | w/o FTE | with FTE |
|---|---|---|
| Production | 0.33 | 0.21 |
| Idle No Operator | 0.18 | 0.10 |
| Idle No WIP | 0.12 | 0.08 |
| Unavailable | 0.36 | 0.61 |

The column titled "w/o FTE" shows how the capacity analysis system originally allocated total time between production, idle-no-operator, idle-no-WIP, and unavailable. The column "with FTE" shows the result of combining the chamber state and production data. The major increase in unavailable time was driven by one chamber being down for a significant part of the measuring period. As a result, even though the tool was still processing product, its performance was severely degraded. This analysis capability allows for this chamber unavailability to be captured at the tool level.

This invention discloses a methodology for calculating the performance components of multi-chamber tool. Although the examples relate to semiconductor manufacturing, this invention could be applied to any manufacturing environment where multi-chamber tools are used. By combining chamber state, handler state, and production data, a clear understanding the of the magnitude each of the capacity detractors can be determined. As a result, the appropriate engineering, maintenance, or manufacturing group can be focused on fixing the right problem to increase productivity.

Figure 8:
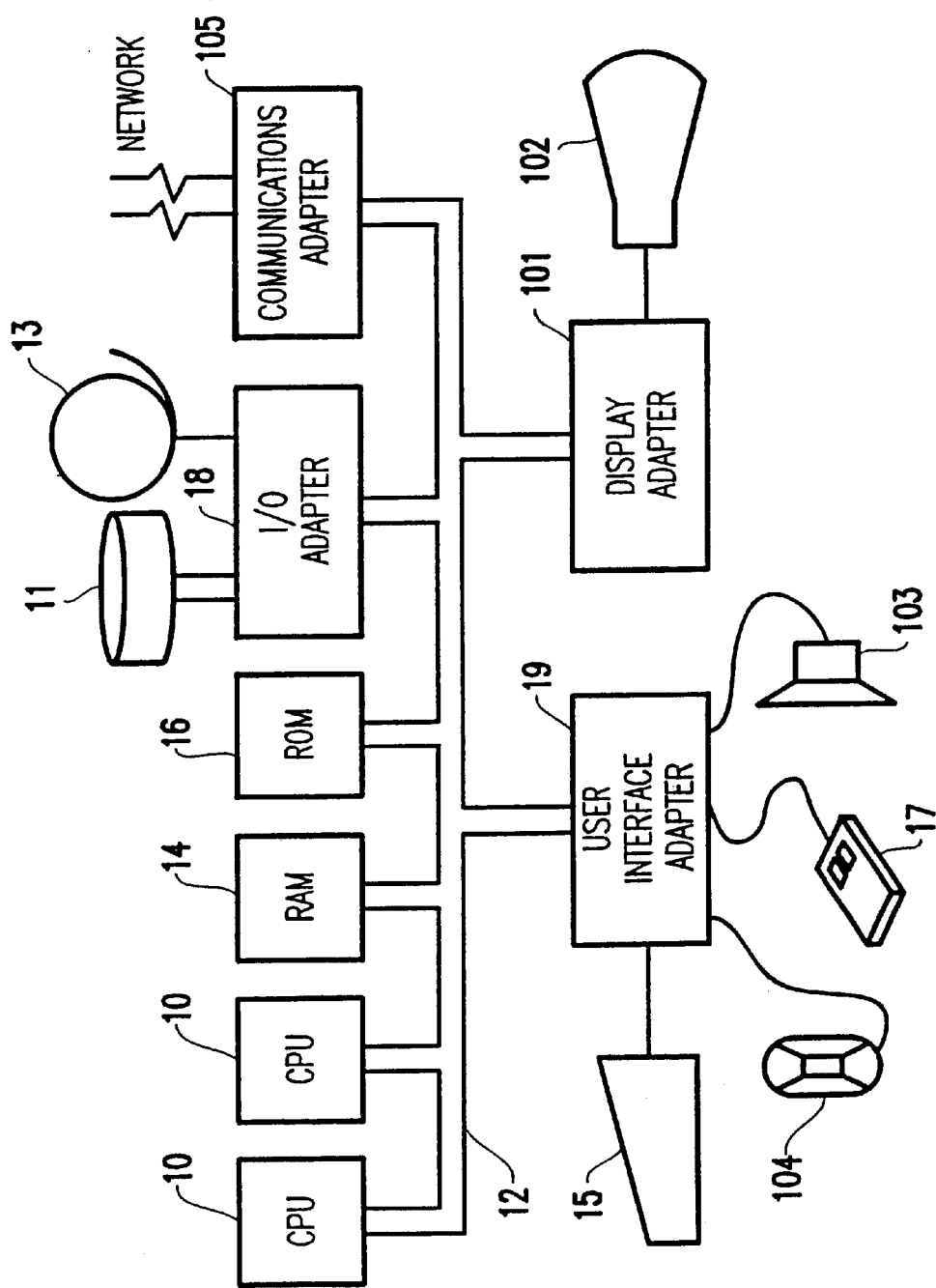
FIG. 8 shows a typical computer system environment for running a computer-based multi-chamber analysis methodology.

A representative hardware environment for practicing the present invention is depicted in FIG. 8, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13 in which the tool databases reside, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network which may receive operator and tool information directly from the tools, and display adapter 101 for connecting bus 12 to display device 102. A program storage device readable by the disk or tape units, is used to load the instructions which instantiate the multi-chamber capacity analysis methodology provided by this invention and which is also loaded onto the computer system.

Although the present invention has particular applications to certain specific embodiments, such as multi-chamber, this does not limit the present invention. Other modifications may be made by one skilled in the art without departing from the overall spirit and scope of the present invention. Thus, the present invention is to be construed as limited only by the appended claims which follow.

We claim:
1. The method of calculating a capacity component in a multi-chamber tool, said tool comprising a plurality of process chambers in an up or down state, the method comprising the steps of:

(a) querying a database to retrieve the total amount of time each chamber is in an up or down state and individual components contributing to capacity loss during a predetermined time period;
(b) calculating the full tool equivalent capacity loss component by using the formula $$\frac{\text{Time}(N) + [(N-1)/N]*\text{Time}(N-1) \ldots [(N-(N-1))/N]*\text{Time}(1)}{\text{Total Time}}$$

where N is the number of chambers in the multi-chamber tool and the Time function represents the time the proscribed number of chambers in are in an up or down state for that capacity component, whereby the full tool equivalent is obtained;
(c) calculating the production capacity loss component;
(d) calculating tool unavailable and idle-no-operator capacity components, and
(e) determining the idle-no-WIP in progress capacity component through the equation:

idle-no-WIP=1−tool unavailable−production−idle-no-operator.

2. The method of calculating the capacity components of a multi-chamber tool, said tool comprising a plurality of process chambers in an up or down state, the method comprising the steps of:
(a) querying a database to retrieve the total amount of time in each chamber state;
(b) modifying the chamber states based on a handler state;
(c) calculating a tool availability component by weighting said total amount of time in each chamber state by the fraction of the chambers in that state and dividing by the total time;
(d) querying a database to retrieve the total amount of production time in each chamber state;
(e) calculating a production component by weighting said total amount of production time in each chamber state by the fraction of the chambers in that state and dividing by the total time;
(f) determining an idle-no-operator state by querying a lot state database and a chamber states database;
(g) modifying said chamber states based on said idle-no-operator state;
(h) calculating a total amount of time in each modified chamber state;
(i) calculating an operator availability component by weighting said total amount of time in each modified chamber state by the fraction of the chambers in that state and dividing by the total time, and subtracting from said tool availability component;
(j) calculating an idle-no-wip component by subtracting from 1 the sum of said production component, said operator availability component and said tool availability component.

* * * * *